Jan. 7, 1958  F. C. MOCK  2,818,847
INTERNAL COMBUSTION ENGINE CONTROL
Filed May 15, 1942  5 Sheets-Sheet 1

INVENTOR
FRANK C. MOCK
BY
A. R. McCrady
ATTORNEY

Jan. 7, 1958 F. C. MOCK 2,818,847
INTERNAL COMBUSTION ENGINE CONTROL
Filed May 15, 1942 5 Sheets-Sheet 4

INVENTOR
FRANK C. MOCK
BY
A. R. McCrady
ATTORNEY.

Jan. 7, 1958 F. C. MOCK 2,818,847
INTERNAL COMBUSTION ENGINE CONTROL
Filed May 15, 1942 5 Sheets-Sheet 5

INVENTOR
FRANK C. MOCK
BY
ATTORNEY

United States Patent Office 2,818,847
Patented Jan. 7, 1958

1

2,818,847

INTERNAL COMBUSTION ENGINE CONTROL

Frank C. Mock, South Bend, Ind., assignor to Bendix Aviation Corporation, South Bend, Ind., a corporation of Delaware Application May 15, 1942, Serial No. 443,042

41 Claims. (Cl. 123—103)

This invention relates to controls for internal combustion engines and more particularly to charging pressure, engine speed and supercharger controls for such engines.

Present day supercharged engines are generally provided with superchargers capable of maintaining the maximum permissible or safe charging pressures up to some predetermined altitude, and below this altitude the engine must be throttled, or the effective supercharger output otherwise controlled, to prevent overcharging and possible resulting damage to the engine. A device generally referred to as a boost control is commonly provided for this purpose, and usually operates to automatically regulate or limit the throttle opening to control the charging pressure. In accordance with the present invention a variable datum type of boost control is used in which the charging pressure being maintained by the boost or charging pressure control is varied by change in the position of the pilot's control lever.

In addition to controlling or limiting the engine charging pressure, it is desirable to also control the engine speed and to correlate it with the charging pressure so that both the charging pressure and the horsepower developed at a given charging pressure are prevented from exceeding the permissible values. In the present invention a single lever is provided in the pilot's compartment which sets the boost control datum, thereby determining the operating charging pressure, and also sets a propeller pitch governor, which varies the propeller pitch so as to maintain a selected speed. The charging pressure and engine speed controls of the instant invention are in many respects similar to those described and claimed in my copending application Serial No. 440,669, filed April 27, 1942 and now Patent No. 2,453,651 granted November 9, 1948.

In order to increase the rated altitude of the airplane, that is, the maximum altitude at which the engine is able to develop its full rated horsepower, many engines, particularly of the military type, are provided with multiple step supercharging systems either of the multi-speed type, in which the ratio of the supercharger impeller to engine speed may be varied; or of the multi-stage type, in which two or more superchargers are arranged in series and one or more of them may be rendered inoperative; or of a combination multi-speed multi-stage type. With such systems the first step or degree of supercharging is generally sufficient to maintain the rated horsepower up to a predetermined altitude, the second step will maintain it up to some predetermined higher altitude, and additional steps will successively maintain it up to still higher altitudes.

To avoid wasting the added power consumed by a higher step of supercharging it is desirable to control or limit the supercharging step being used so that a high supercharging step will not be used when a lower step has sufficient capacity to maintain the rated or selected charging pressure and horsepower. Heretofore shifting from one supercharging step to another has been accomplished manually;

2 however, this is particularly disadvantageous in military aircraft since it requires constant attention of the pilot to increase the step when the power developed in the lower step is insufficient, and to decrease the step when the lower step is sufficient to maintain the selected power so as to conserve fuel. In the present invention the pilot concurrently selects the engine charging pressure and preselects the altitude at which the supercharger shift will be made whereby the shift either to a higher or lower step is accomplished automatically when the altitude and selected charging pressure are such that the shift is indicated. A manual lockout is also provided whereby the pilot may lock the supercharger in the low step if he should so desire.

Upon increase in the supercharger step a greater portion of the horsepower developed by the engine is consumed by the supercharger and less is available at the propeller. To avoid a loss in power at the propeller upon an increase in supercharger step I propose to automatically and simultaneously increase the charging pressure being maintained by the boost control for a given setting of the pilot's control lever to at least partially compensate for the increased power consumption of the supercharger; however, to avoid overcharging and possibly damaging the engine, the increase is either reduced in amount or entirely eliminated when the pilot's control lever is already set for substantially the maximum permissible or safe charging pressure.

It is accordingly an object of the present invention to provide an improved control for an internal combustion engine.

Another object of the invention is to provide an improved supercharger control for an internal combustion engine having a multiple step supercharging system.

Another object of the invention is to provide a correlated charging pressure and supercharger shift control for an engine having a multiple step supercharging system.

Still another object of the invention is to provide a boost or charging pressure control for an internal combustion engine in which the datum of the boost control is varied upon change in the supercharger step.

Another object of the invention is to provide a variable datum charging pressure control and an automatic control for varying the supercharging step, in which the pilot concurrently varies the datum of the charging pressure control and preselects an altitude at which the automatic control will operate to change the supercharger step.

A further object of the invention is to provide a correlated charging pressure, engine speed, and supercharger control for an internal combustion engine having a multiple step supercharging system.

Another object of the invention is to provide a compact, vibration resistance control unit for correlating charging pressure, engine speed, and the supercharger step.

A still further object of the invention is to provide a simplified pilot's control for an internal combustion engine having a multiple step supercharging system.

Another object of the invention is to provide an automatic supercharger step selector for an internal combustion engine having a multiple step supercharging system.

Many other objects and advantages will be readily apparent to one skilled in the art from the following description taken in connection with the appended drawings in which.

Figure 1:
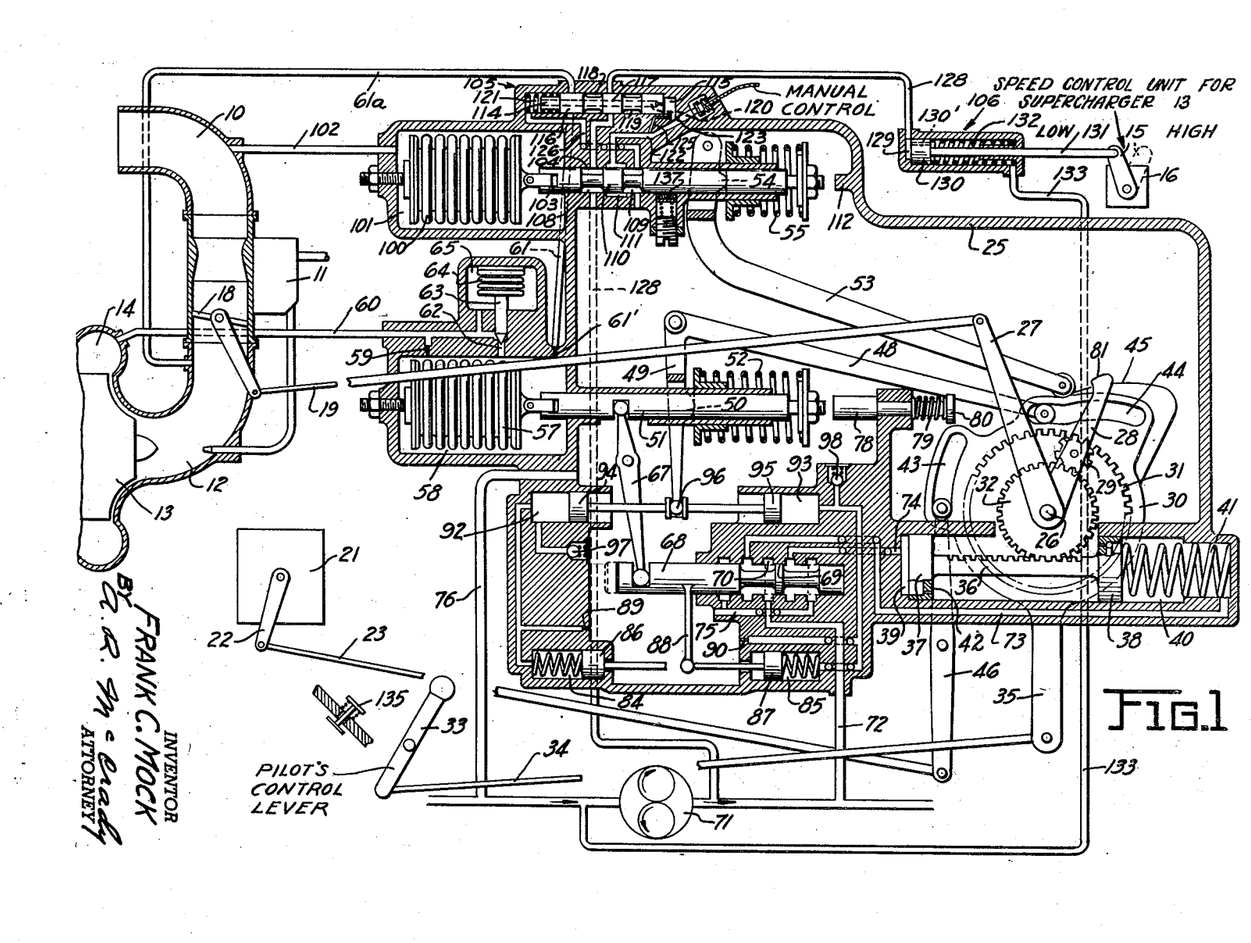
Figure 1 is a diagrammatic sectional view of the invention.

With particular reference to Figure 1 there is shown an induction passage for an internal combustion engine having an air inlet or scoop 10, a charge forming device indicated generally at 11, and a section 12 leading to the entrance of a supercharger 13 having an annular discharge ring 14 from which the individual cylinders are supplied. The supercharger 13 is of the two speed type in which the supercharger speed or step is varied by a lever 15 of a supercharger speed control unit 16, the supercharger being in low blower, or low speed, when the lever 15 is to the left, as shown, and in high blower, or high speed, when the lever is to the right. Although a two speed supercharger posterior to the charge forming device is disclosed, this is for purpose of illustration only, it being readily apparent that it could be anterior to the carburetor; or a two stage blower could be used, the auxiliary stage being either anterior or posterior to the charge forming device 11, in which case the control unit 16 and operating lever 15 would control the operation of the auxiliary stage, note Figure 11 wherein the auxiliary stage supercharger is indicated at 14', the control unit at 16' and the operating lever at 15', while other parts which correspond to those of Figure 1 are given corresponding reference numerals. Similarly the supercharging system could have more than two speeds or more than two stages, or a combination of speeds and stages; or a variable capacity supercharging system of any other type could be used in which a control element such as lever 15 varies the supercharging capacity. The terms "multiple-step," "variable-step" etc., as used in certain of the appended claims are meant to designate any of the aforementioned or other types of supercharging systems in which the supercharger capacity may be varied relative to engine speed.

A throttle 18 variably limits the quantity of air flowing through the induction passage to the cylinders of the engine and is controlled through a link 19 by mechanism hereinafter described. A propeller pitch governor indicated generally at 21 controls the pitch of the propeller (not shown) to maintain the engine speed at a value determined by the position of a rod or lever 22, the latter being controlled through a link 23 by mechanism hereinafter described. The propeller pitch or engine speed control 21 may be of the electric, hydraulic, or of any other desired type.

The main control unit includes a casing 25 having a main shaft 26 rotatably mounted therein. A lever 27 is secured to the shaft 26 exteriorly of the casing and is pivotally connected to the link 19 leading to the throttle. A second lever 28 having a spur gear pinion 29 pivotally mounted thereon is secured to the shaft interiorly of the casing whereby rotation of lever 28 rotates lever 27 and variably positions the throttle 18. For rotating the lever 28 there is provided a member 30 having an internal spur tooth gear segment 31, and an external spur gear 32, both in mesh with the pinion 29. Member 30 and gear 32 may either be loosely mounted on shaft 26 or otherwise supported to be relatively rotatable about the axis of the shaft. The pinion 29, segment 31 and gear 32 thus form a differential or planetary gear train in which counterclockwise movement of either or both of segment 31 and gear 32 rotates the levers 28 and 27 in a counterclockwise direction and opens the throttle. Similarly clockwise movement of the segment and/or gear closes the throttle.

The gear segment 31 is directly moved or positioned by the pilot by means of a control lever 33 pivotally mounted in the pilot's compartment and connected through a link 34 with an arm 35 connected to the member 30. The gear 32 is automatically operated by means of a gear rack 36 connected to fluid actuated pistons 37, 38 slidably received in cylinders 39 and 40. Full movement of lever 33 to the left, with the rack and piston assembly inoperative in its extreme left-hand position, preferably opens the throttle to a point at least sufficient to maintain cruising operation but insufficient to overcharge and so damage the engine. The pistons 37 and 38 are preferably provided with oil bypass ports 42, when oil actuation is used, to insure circulation and prevent congealing or freezing of the oil at the low temperatures experienced at high altitudes. A spring 41 urges rack and piston assembly to the left toward its closed throttle position. Although the gear 32 is diagrammatically illustrated as a conventional gear, if desired it may be a member provided with two separate and distinct gear segments, one meshing with the pinion 29 and the other with the rack 36.

The member 30 is provided with cam surfaces 43, 44 and 45 for respectively varying the engine speed, the datum of the boost or charging pressure control and the spring setting of the supercharger shift control. The engine speed cam 43 is engaged by a roller or other type of follower on a pivoted lever 46 which is connected to the link 23 for varying the setting of the propeller pitch governor 21 to thereby vary the engine speed. The charging pressure cam 44 is engaged by a roller or other type of follower on one arm 48 of a pivoted bell crank, the other arm 49 of which is provided with fingers 50 straddling a cylindrical guide of a datum rod 51 and engaging a spring retaining collar for variably loading a charging pressure control datum spring 52 adjustably mounted on the datum rod 51. The supercharger shift cam 45 is likewise engaged by a roller or other type of follower on a pivoted lever 53 having fingers 54 for variably loading a supercharger shift control spring 55.

The boost or charging pressure control includes a sealed evacuated corrugated bellows 57 adjustably mounted at its left end in a chamber 58 and has its free end secured through a universal connection to the left end of the datum rod 51. The spring 52 tends to prevent the evacuated bellows from collapsing. The chamber 58 is connected to the engine manifold through a calibrated restriction 59 and a pipe 60. The chamber 58 is also connected to the induction passage anterior to the supercharger by a calibrated restriction 61' and conduits or bleed passages 61, 61a which, as will be described more fully hereinafter, are closed when the supercharger is in its low step and open when in its high step. When these passages are open, the restriction 61' bleeds air from the chamber 58 thus partially decreasing the pressure in the chamber 58. A bypass 62 provided around the restriction 59 is controlled by a safety-valve 63 secured to a sealed capsule 64 mounted in a chamber 65 in free communication with the passage 60 and/or the engine manifold. The safety valve 63 normally closes the bypass 62 and is adapted to be opened by the capsule 64 when the engine charging pressure exceeds a predetermined value, to thereby substantially nullify the effect of the bleed passage 61 upon the pressure in chamber 58.

Movement of the datum rod 51 is transmitted through a pivoted lever 67 to a servo-motor control valve 68 of conventional construction having a center land 69 which in the equilibrium position of the valve is substantially centrally located relative to a center groove 70 in the valve cylinder, note dotted position in Figure 1, the groove 70 preferably being somewhat wider than the land 69. The right-hand end of the valve cylinder may be vented to the interior of casing 25 to prevent trapping of oil at the right of valve 68. A pump 71, which may either be the main oil pump for the engine or a pump for an auxiliary system, supplies oil through a pipe 72 to the center groove 70 of the servo-valve cylinder. Movement of the valve 68 to the right or left from its central or equilibrium position directs oil received from pipe 72 to the cylinders 40 and 39 through passages 73 and 74, respectively. A duct 75 connects the end grooves of the servo-valve cylinder with the interior of the casing 25 for returning oil to the casing from cylinders 39 and 40. A passage 76 transmits oil from the casing back to the inlet of the pump 71.

In order to limit the supply of high pressure oil to cylinder 39 at such times as the throttle is wide open with the pistons 37 and 38 in an intermediate position, there is provided a servo-motor tripping device comprising a slidably mounted movable stop 78 urged to the right by a spring 79 and having a flange 80 adapted to be engaged by the rounded cam-like portion 81 of the lever 28 as the lever 28 approaches within a few degrees of its wide open throttle position. Movement of stop 78 upon further movement of the lever 28 towards wide open throttle position moves rod 51 to the left and valve 68 to the right, or progressively limits movement of said valve to the left, to thereby increasingly restrict and to finally substantially cut off communication through the servo-valve 68 between the oil supply passage 72 and the duct 74 leading to the servo-motor chamber 39 as the throttle reaches its wide open position.

In order to prevent hunting action or overcontrolling of the bellows actuated servo-valve 68, a pair of oppositely disposed cylinders 84, 85 are provided having damping pistons 86, 87 slidably received therein. Each piston is urged inwardly of the casing by a light spring and has an extension adapted to closely approach the rounded or ball-like end of an arm 88 of the servo-valve 68 when the valve is in its central position. Cylinders 84, 85 are connected to the interior of the casing 25 through restricted passages 89, 90 which limit the rate at which the pistons may be moved inwardly of their cylinders by the arm 88 of the valve 68. If the valve tends to hunt, or to move to the left and right about its equilibrium position, the arm 88 will successively engage the extensions of pistons 86 and 87 which will resist movement of the valve 68 either to the left or right of its equilibrium position. Thus the arm cannot move to the left of its equilibrium position any faster than oil is forced out of the restricted passage 89 by the piston 86. The arm 88 can then move freely to the right to its equilibrium position, during which time the piston 86 returns to its original position somewhat more slowly than the arm because of the restricted inflow of oil to cylinder 84. The piston 87 similarly snubs movement of the arm 88 to the right.

When the control lever 33 is moved and as a consequence the fingers 50 change the load on spring 52, it is generally desirable to have the rod 51 and servo-valve 68 quickly respond to the change. At such times the resisting effect of the pistons 86 and 87 should preferably be eliminated. To accomplish this end a pair of cylinders 92 and 93 are provided in fluid communication with the cylinders 84 and 85 respectively. A pair of pistons 94 and 95 slidably received in cylinders 92 and 93 are secured to the end 96 of the lever 49 so as to be actuated thereby. Upon movement of lever 49 the pistons 94 and 95 displace oil and temporarily withdraw whichever of pistons 86 and 87 would otherwise interfere with the desired rapid movement of valve 68. Thus upon sudden movement of lever 49 to the right the piston 94 withdraws oil from cylinder 84 and draws piston 86 inwardly of cylinder 84. The valve 68 is thus free to move to the left and rod 51 to the right as is desired upon increase in the load on spring 52. Simultaneously the piston 95 displaces the oil in cylinder 93 which may, due to the forceful and positive actuation of lever 49, escape sufficiently rapidly through port 90 as not to restrict rapid movement of lever 49. If desired, however, pressure relief valves 97 and 98 may be provided to eliminate undue resistance to the movement of lever 49.

For controlling the shift of the supercharger from one speed or step to another, there is provided a sealed capsule 100 adjustably mounted at one end in a chamber 101 connected to the air inlet 10 by a pressure transmitting pipe 102. The free or movable end of the capsule 100 is connected to one end of a rod 103, the other end of which is provided with an adjustable spring retainer against which the supercharger shift control spring 55 reacts. The rod 103 is slidable within a bore 104 with which it cooperates to form a servo-valve for controlling the flow of oil to a quick-acting valve indicated generally at 105, which in turn controls the flow of oil to a fluid operated supercharger shifting device indicated generally at 106.

The rod 103 is provided with a pair of grooves 108, 109 separated by a land 110 having a width approximately the same as that of a groove 111 in the bore 104. As shown, the rod 103 is in substantially its most left-hand position in which the land 110 closes off communication between the grooves 108 and 111. A stop 112 limits the permissible movement of rod 103 to the right at which time the groove 108 is in free communication with the groove 111.

The quick acting valve 105 includes a valve member 114 slidable within a cylinder 115 and provided with lands 116, 117 and grooves 118, 119. The valve member 114 has a restricted oil circulating port 120 therethrough. A spring 121 urges the valve member to the right. A passage 122 leads from the groove 111 to the right-hand end of the cylinder and is controlled by a spring loaded valve 123 adapted to be actuated from the pilot's compartment by means of a cable or other type of control. A small bypass 125 is provided around the valve 123 having sufficient flow capacity to provide oil circulation through the quick-acting valve assembly when the valve 123 is closed but having insufficient capacity to move the valve member 114 to the left against the spring 121. Oil passing through the valve 114 is returned to the casing by a passage 126 which may lead directly to the interior of the casing or may lead to the casing through the groove 109 as shown.

A passage 128 leads from the high pressure side of the oil pump 71 through the casing of valves 103 and 114 to the left-hand end of a cylinder 129 of the shifting device 106. A piston 130 slidable in the cylinder 129 and having a restricted oil circulating port 130' therethrough is connected by a link 131 to the shift lever 15 and is urged to the left toward its low supercharger step position by a spring 132. Oil passing through or past the piston 130 is transmitted back to the interior of the casing 25 or directly to the inlet of the pump by a pipe 133. The passage 128 is controlled by the quick-acting valve 114 and is arranged to be closed by the land 117 when the valve is in its right-hand position, as shown in Figure 1, and opened by the groove 119 when the valve 114 is in its left-hand position. The land 116 and groove 118 similarly close and open the bleed passage 61 leading from the boost control bellows chamber 58 to the conduit 61a which connects with the induction passage anterior to the supercharger.

The passage 128 preferably extends transversely through the bore 104 in line with the groove 108 to transmit high pressure fluid thereto which upon movement of the shift rod 103 to the right supplies oil to passage 122 and, if valve 123 is opened, to the right-hand end of cylinder 115 for moving the valve member 114 to the left. If desired, separate oil passages could obviously be provided, one leading from the pump 71 to the groove 108 and the other from the pump through the quick acting valve to the shifting device 106.

The operation of the device is as follows: at sea level with the throttle closed and the engine idling the various parts will occupy substantially the positions shown in Figure 1, at which time the knob of control lever 33 is to the extreme right, the cam followers of levers 46, 48 and 53 are in engagement with the low portions of cams 43, 44 and 45, and the two pairs of fingers 50 and 54 are in substantially their most left-hand positions whereby the springs 52 and 55 are loaded with but moderate forces which are insufficient to prevent partial collapse of the bellows 57, even under the relatively low pressure in the engine manifold and in chamber 58, and of the bellows 100 under ground level atmospheric pressure in the inlet 10 and in chamber 101. Because of the collapsed state of bellows 57 the valve 68 is to the extreme right whereby oil under pressure is transmitted from pipe 72 through the servo-valve and passage 73 to the chamber 40 where it acts on piston 38 and, together with spring 41, holds the rack 36 in its extreme left-hand position, thus substantially locking the gear 32 against rotation. The shift control rod 103 being in its left-hand position cuts off the supply of high pressure oil to the quick-acting valve chamber 115 and as a consequence the supply of oil through passage 128 to the shifting unit 106 is cut off by the land 117 of the quick-acting valve 114. The land 116 of this valve likewise cuts off the bleed 61 and as a consequence the pressure in the boost control bellows chamber 58 is equal to that in the manifold 14. In the absence of oil supply to the shifter cylinder 129 the spring 132 holds the piston 130 in its extreme left-hand position and the lever 15 in its low supercharger step position.

If the knob of lever 33 is gradually moved to the left, the member 30 will move in a counterclockwise direction causing the pinion 29 to move in a similar direction around the gear 32. This movement of the pinion is transmitted through lever 28, shaft 26, and lever 27 to the throttle link 19 thereby opening the throttle. As the throttle opens the charging pressure acting on bellows 57 increases and tends to maintain the bellows in its collapsed state; however, as lever 33 is moved, the rise in cam 44 approaches and engages the roller follower of lever 48 thereby moving the fingers 50 to the right to increase the load on spring 52 tending to expand bellows 57. The abrupt rise in cam 44 increases the spring load at a rate greater than the rate of increase of the pressure collapsing force on bellows 57 resulting from the manual opening of the throttle, whereby the spring force overcomes the pressure force and moves the rod 51 to the right and, through lever 67, moves the servo-valve 68 to the left until the valve reaches its normal equilibrium position in which the land 69 is substantially centered relative to the groove 70. At this time the throttle is partially open and the engine is operating at a speed and load greater than those corresponding to idling but preferably less than the minimum values experienced during cruising. Through this range of movement of lever 33 the pilot has a direct mechanical control of the throttle, the boost control being substantially inoperative. This initial manually controlled throttle range is desirable since the engine manifold pressure at idling and near idling tends to be unstable and would result in excessive hunting action of the boost control.

If the knob of lever 33 is now moved an additional amount beyond the range of direct throttle actuation, the cam 44, bell crank levers 48 and 49, and fingers 50 further load spring 52 and move the rod 51 to the right and the servo-valve 68 to the left from their neutral or equilibrium positions. Oil from passage 72 is then transmitted through the valve 68 and passage 74 to the chamber 39; and the chamber 40 is connected through the passage 73 and valve 68 to the passage 75 for returning oil to the casing 25. The high pressure oil forces piston 37 and rack 36 to the right against spring 41 thereby rotating gear 32 in a counterclockwise direction, causing pinion 29, lever 28, shaft 26 and lever 27 to also move in a counterclockwise direction thereby opening the throttle 18 until the engine manifold pressure transmitted to chamber 58 becomes sufficiently great to collapse the bellows 57 and move the servo-valve 68 toward its equilibrium position.

During operation above the direct manually controlled throttle range hereinabove described, the pilot, in positioning lever 33 and the member 30 with its cam 44, determines the load on spring 52 and therefore determines the pressure in chamber 58 which the boost control will maintain by variably positioning the throttle. For example, if at a given setting of the lever 33, the charging pressure decreases as by increase in altitude, the bellows 57 will expand slightly, causing the servo-valve 68 to move to the left to increase the flow of oil to the servomotor chamber 39, thereby moving the piston 37 further to the right and opening the throttle an additional amount so as to maintain the selected operating charging pressure. An increase in charging pressure, as by decrease in altitude will produce the reverse effect and result in a slight closing of the throttle. It will be apparent that if desired, the servo-motor could be of a type supplying oil only to chamber 39 and not to chamber 40, in which case only the spring 41 would be relied upon to move the rack 36 to the left.

The pilot's control lever 33, in positioning the member 30, also determines the propeller pitch governor setting by means of the cam 43. A correlated control of charging pressure by means of cam 44 and engine speed by means of cam 43 is thus provided. Although the cams 43 and 44 are shown with particular profiles, it will be readily apparent that the profiles may be independently varied to produce any desired correlation between the position of lever 33, the selected charging pressure, and the setting of the propeller pitch governor.

Normally the first or low step of a multiple step supercharging system has more than sufficient capacity to maintain the charging pressure by lever 33 from ground level up to some predetermined or critical altitude, the particular altitude being dependent upon the value of the pressure selected. For example, if at ground level the lever 33 is placed in its mid position, the charging pressure determined by the cam 44 and spring 52 will obtain in the engine manifold 14 with the throttle but partially open. If the airplane now ascends, the boost control will gradually open the throttle so as to maintain the selected charging pressure notwithstanding the reduced atmospheric pressure accompanying the increase in altitude; and this will continue until an altitude is attained at which the throttle is wide open. This altitude is generally referred to as the critical altitude in low blower for the particular charging pressure selected. If the lever 33 had been set for a lesser charging pressure a greater altitude could be obtained before the throttle reached wide open position; and similarly if a greater charging pressure had been selected, the critical altitude would be less.

During operation below the critical altitude in low blower for a given setting of the lever 33 the low supercharger step should be used since it consumes less power than a higher step and has ample capacity for maintaining the selected charging pressure. To accomplish this end, the cam 45 has a profile such that at each position of the lever 33 the lever 53 will load the spring 55 with a force equal to the collapsing force on the bellows 100 of the entering air pressure at substantially the critical low blower altitude for the particular setting of lever 33. If desired the spring force could be made equal to the collapsing force at an altitude somewhat less than or somewhat greater than critical altitude, or at any other altitude at which it is desired to shift the supercharger into its higher step. At altitudes below the shift altitude, the entering air pressures will be sufficiently great to maintain the bellows in a collapsed position; however, as the shift altitude is approached and exceeded the decreasing pressure in chamber 101 permits the spring 55 to move rod 103 to the right whereby oil under pressure is transmitted from passage 128 and groove 108 into groove 111 and passage 122. The lever 33, through the intermediary of the cam 45, lever 53, and spring 55, thus preselects the entering air pressure or altitude at which the rod 103 will move to the right and the supercharger step will be changed, as hereinafter described.

Assuming that the valve 123 is open at this time, as it normally is, oil is freely supplied to the chamber 115 and rapidly moves the valve 114 to the left. Land 117 is quickly moved out of its restricting position in the passage 128 and oil is freely supplied through groove 119 and passage 128 to the shifter cylinder 129 where it quickly moves the piston 130 and lever 15 to the right. The supercharger is thus quickly shifted into its high step position as desired, notwithstanding the fact that the groove 108 may have been but slowly brought into communication with the groove 111. It will be apparent that if a slow shift is not objectionable, the passage 128 could terminate at the groove 108 and the passage 122 could lead to the cylinder 129; or a quick shift could be accomplished with this alternative construction by providing a mechanical quick-acting shift arrangement between the piston 130 and lever 15 such that a quick shift would occur even though oil was slowly supplied to chamber 129.

Upon completion of the supercharger shift and as the high supercharger step becomes effective, the pressure in chamber 58 will tend to rise above the value selected by the spring 52; however, the bellows 57 and servo-valve 68 function as previously described and partially close the throttle to maintain the pressure in chamber 58 at the selected value. Upon further increase in altitude, the boost control gradually opens the throttle so as to maintain the selected pressure until the airplane reaches the critical altitude in high blower for the particular setting of the lever 33, at which time the throttle is again wide open. Upon further increase in altitude the manifold pressure will decrease as a result of the decreased atmospheric pressure, unless a third supercharger step is provided which similarly would maintain the selected charging pressure up to a critical altitude for the third step.

Movement of the valve 114 to the left at the time of the supercharger shift also opens the bleed passages 61, 61a which had previously been closed by the land 116 of the valve. Since these passages lead to a lower source of pressure than the passage 60, the pressure in chamber 58, with the bleed passage 61 open, will be somewhat lower than the pressure in the manifold 14. As a consequence, the boost control, which regulates the throttle to maintain a particular pressure in chamber 58, will maintain a somewhat higher pressure in the manifold 14, for a given setting of the lever 33, when the supercharger is in its high step with the bleed 61' open than when in the low step with the bleed closed. A somewhat higher power is therefore developed by the engine when in high blower to at least partially compensate for the increased power consumption of the supercharger when in its high step. Were it not for the bleed 61', the power available at the propeller for a given setting of lever 33 would decrease at the time of shift because of the increased power consumption of the supercharger, and the pilot would have to move the lever an increment to the left to obtain the same propelling power as was present in low blower. In some types of military service this is undesirable. Obviously if this type of action is objectionable the bleed 61' and passages 61, 61a could be eliminated, in which case the pressure in chamber 58 would always equal that in the manifold 14 regardless of the supercharger step, and the boost control would function to maintain these pressures at the value determined by the spring 52. If desired, the passages 61, 61a could lead to a source of pressure other than the induction passage anterior to the supercharger, provided the said other source is at a lower pressure than the manifold 14 when the bleed 61' is open so that the pressure in chamber 58 will be less than that in the manifold.

In some installations, the lever 33 when in its extreme lefthand position determines a low blower charging pressure equal to the maximum permissible charging pressure for sustained engine operation. Opening the bleed 61' upon shift into high blower under these conditions would raise the manifold pressure above that being maintained in low blower and consequently above the maximum permissible value. To avoid this undesirable condition, the bellows controlled valve 63 is provided which is arranged to open when the maximum permissible charging pressure is reached. The chamber 58 is thus placed in substantially free communication with the passage 60 and manifold 14 whereby opening of the bleed 61' has substantially no effect upon the pressure in chamber 58.

By closing valve 123 the pilot is able to lock out the automatic supercharger shift control whereby the supercharger is maintained in low blower at all times. Thus with the valve 123 closed the restricted bypass 125 so limits the flow of oil to the cylinder 115 that it escapes through the passage 120 in the valve 114 without moving the valve 114 to the left. Passage 128 is thus maintained closed.

During periods of operation when the throttle is wide open but the selected manifold pressure is not being maintained, as at altitudes above the low blower critical altitude when the high supercharger step is not being used, or at altitudes above the high blower critical altitude, the servo-valve 68 will be to the left and full oil line pressure will be admitted to chamber 39 in an effort to further open the throttle so as to maintain the desired charging pressure. With the throttle against the wide open stop, not shown, additional counterclockwise movement of the levers 28 and 27 is prevented and as a consequence, the oil pressure on piston 37 would move rack 36 to the right rotating pinion 29 on its axis thereby forcing member 30 in a clockwise direction and moving lever 33 toward closed position against the frictional force normally resisting change in position of lever 33. Such action would continue until the reduced charging pressure required by the changed position of member 30 and cam 44 could be obtained or until the servo-piston 38 was against its stop. In addition such action would change the position of cam 43 and consequently the engine speed setting. To prevent this undesirable action the stop 78 is provided which is urged to the left by the cam 81 of lever 28 as lever 28 approaches its wide open position. The stop 78 moves the rod 51 to the left and servo-valve 68 to the right until the flow of oil to cylinder 39 is just sufficient to balance the force of spring 41 and retain the piston 37 and rack 36 in their desired intermediate position. Further movement to the left of lever 33 tends to move the lever 28 a slight additional amount in the counterclockwise direction which through stop 78 moves valve 68 to the right to further restrict the flow of oil to chamber 39 whereby the piston 37 and rack 36 moves to the left to permit pinion 29 to rotate on its axis in response to the movement of the member 30 without appreciably changing the position of lever 28. The pilot is thus able to move the cam 43 to increase the engine speed even though the throttle is in a substantially wide open position.

In some installations an override feature is desired whereby for emergency operation the pilot is able to increase either the permissible charging pressure and/or the engine speed to values somewhat higher than normally permitted or desired. For this purpose a spring loaded stop 135 is provided which normally limits the permissible power increasing movement of lever 33; however, during an emergency the pilot can overcome the force of the spring stop and move lever 33 an additional amount. The end portions of cams 43 and 44 can be given any desired configuration to increase the charging pressure and/or engine speed any desired amount.

It is generally desirable to have the supercharger shift control so arranged as to shift into the high step at an altitude slightly greater than the altitude at which it shifts back to the low step to avoid shifting back and forth upon slight variations in altitude during sustained operation at a shift altitude. The natural hysteresis of the bellows 100 together with the frictional drag on the rod 103 will tend to inherently provide such a spread between the shift altitudes. If desired, however, a friction pad 137 arranged to be adjustably loaded may be provided engaging the shaft 103 whereby the spread between the shift altitudes may be increased to any desired value. Similarly, a ball or other type of detent could be used on the shaft 103 instead of the friction type of detent to provide the desired spread.

In the multi-stage system of Figure 11, the auxiliary blower 14' may be automatically brought into operation at some predetermined or critical altitude by movement of the control lever 15' to the right in the same manner as described in connection with the shift to high blower of the supercharger of Figure 1, and likewise may be cut out below such critical altitude by movement of said lever to the left, the position shown in full lines in Figure 11.

Figure 2:
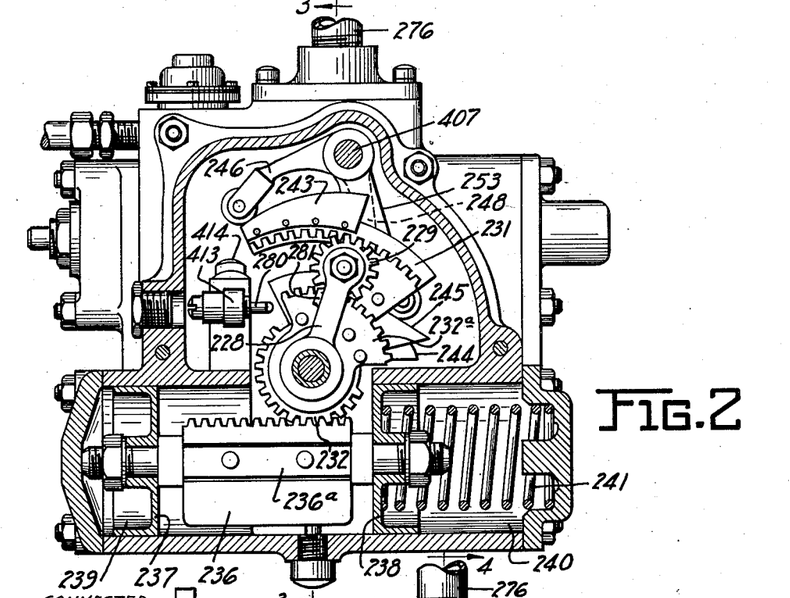
Figure 2 is a vertical sectional view of a preferred embodiment of the invention taken on the line 2—2 of Figure 3.

Figures 2–8 are views of a preferred embodiment of the control diagrammatically illustrated in Figure 1, in which parts corresponding to parts of Figure 1 have been given corresponding reference numerals with the addition of 200, and other parts either not previously identified or having no counterpart in Figure 1 have been given reference numerals in the 400 series. In this embodiment a lever 227, adapted to be connected to the engine or carburetor throttle, is secured to a rotatably mounted hollow shaft-like extension 226 of a lever 228 on which a pinion 229 is pivotally mounted. A lever 235, adapted to be connected to the pilot's control lever, is secured to a rotatable shaft 402 extending through the hollow shaft-like extension 226 and having a member 230 pin connected thereto to which an internal toothed gear segment 231 is secured to be rotated by lever 235. The pinion 229 is in engagement with the gear segment 231 and with a gear segment 232a riveted to a member 232 rotatably mounted on the shaft 402 and provided with gear teeth engaging a gear rack member 236 secured to a member 236a. Pistons 237 and 238 are secured to the ends of member 236a and the assembly is urged to the left, as shown in Figure 2, by a spring 241. A screw 403 is threaded into the bottom of casing 225 and has a rod-like extension 404 received within a slot 405 in the rack member to prevent the piston assembly from rotating. Cams 243, 244, and 245, for varying the propeller pitch governor setting, the boost control datum, and the supercharger shift control spring setting respectively, are secured, as by riveting, to the member 231.

Figure 3:
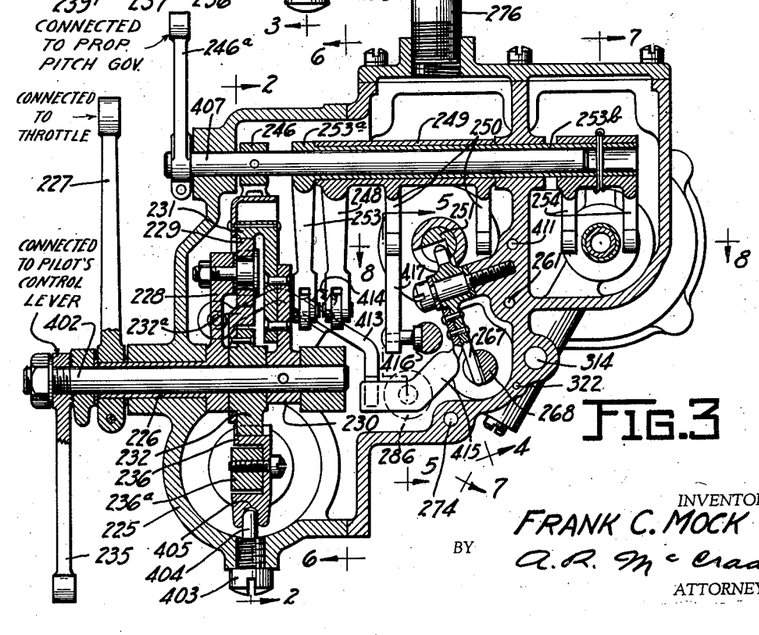
Figure 3 is a similar view of the invention taken on the line 3—3 of Figure 2.

A lever 246, provided with a roller follower in engagement with cam 243, is pinned or otherwise secured to a shaft 407 rotatably mounted in the casing 225 and provided at its outboard end with a lever 246a secured thereto which is adapted to be connected to the control rod or lever of a propeller pitch governor. A member 253a, rotatably mounted on shaft 407, is provided with an arm 253 having a roller follower in engagement with the cam 245. The member 253a has a long sleeve-like extension 253b, extending beyond the inboard end of shaft 407, to which is secured a member having a pair of finger-like extensions 254 engaging a loading collar of a supercharger shift control spring 255. A member 249 is rotatably mounted on the sleeve-like extension 253b and is provided with an arm 248 having a roller follower in engagement with the cam 244. The member 249 is also provided with a pair of finger-like extensions 250 engaging a loading collar of a boost control datum spring 252.

Figure 4:
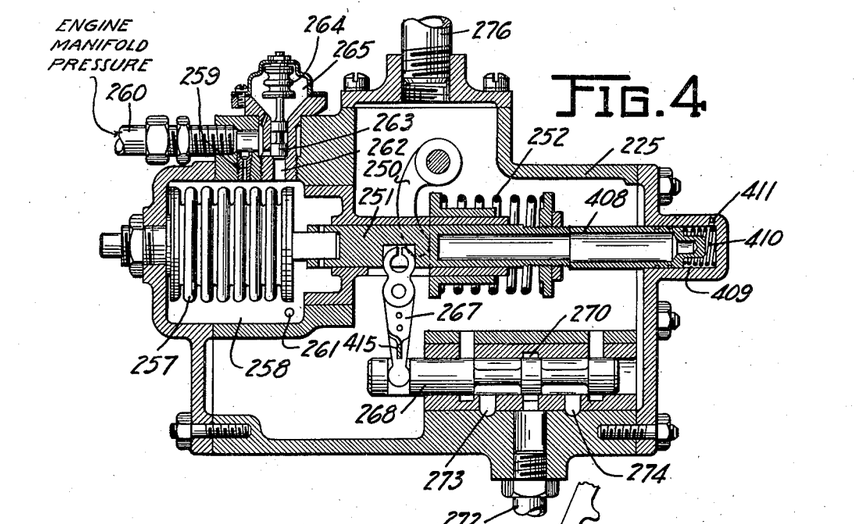
Figure 4 is a vertical sectional view of the invention taken on the line 4—4 of Figure 3.

As best shown in Figure 4, the boost or charging pressure control includes a datum rod 251 connected to a bellows 257 adjustably mounted in a chamber 258 adapted to be connected to the engine manifold through a calibrated orifice 259 and pipe 260. A by-pass 262 around the orifice 259 is controlled by a safety valve 263 adapted to be opened by a pressure responsive capsule 264 when the pressure in passage 260 and chamber 265 exceeds some predetermined value. A calibrated passage 261 leads from the chamber 258 through quick-acting valve 314 to the induction passage anterior to the supercharger for partially destroying the pressure in chamber 258 during operation in the high supercharger step. Movement of the datum rod 251 actuates a servo-motor control valve 268 through a pivoted lever 267, in the same manner as previously described in connection with Figure 1, to thereby control the flow of oil from an oil supply pipe 272 to the servo-motor pistons 237 and 238.

To eliminate the effect of substantially atmospheric pressure within casing 25 on the right hand end of datum rod 251, a plunger 408 in co-axial abutting relation with the rod 251 is slidably received in a cylinder 409 formed in the wall of the casing 225. A spring 410 maintains the plunger 408 and rod 251 in contact. The cylinder 409 is vented through a passage 411 leading to the chamber 258. The pressure existing in the casing 225 acts equally on rod 251 and plunger 408 and, being insufficient to overcome the spring 410, is thus balanced out. Making the rod 251 and plunger 408 as two separate abutting pieces rather than integral, eliminates difficulties which might otherwise exist due to misalignment of the rod 251 and the cylinder 409.

Figures 5, 6:
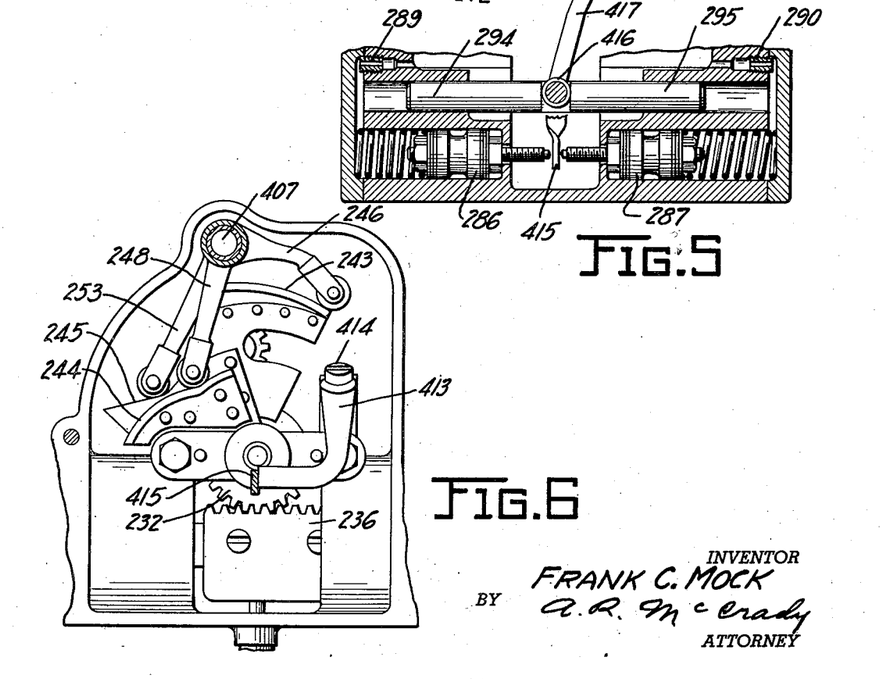
Figure 5 is a partial view in section taken on the line 5—5 of Figure 3 and showing the anti-hunt device.
Figure 6 is a partial view in section taken on the line 6—6 of Figure 3 and showing the cam and followers for varying the datum of the boost control, the setting of the propeller pitch governor, and the setting of the supercharger shift control spring.

In order to trip the boost control servo-motor when the throttle reaches wide open position, a pad 281 (Figure 2) is provided on the lever 228 which is adapted to engage the end of an adjustable screw 280 mounted on one end of a lever 413 pivotally received on a stud 414. The other end of the lever 413 is provided with a lateral extension adapted to engage a member 415 riveted to and extending from the pivoted lever 267, as is best shown in Figures 3 and 6. Thus, when the throttle actuating lever 228 approaches within a few degrees of its wide open position the pad 281 engages the screw 280 of lever 413 and through extension 415 of lever 267 forces the servo-valve 268 to the right as shown in Figure 4, to decrease the supply of oil to the piston 237 as explained in connection with Figure 1.

The member 415 also extends between the dashpot pistons 286 and 287 of the anti-hunt device, as best shown in Figures 5 and 3, whereby hunting movement of the servo-valve 268 is resisted. Upon movement of lever 235 the snubbing action of pistons 286 and 287 is eliminated by the movement of the piston-like ends 294 and 295 of a rod actuated by a disk 416 secured to an extension 417 of the left hand finger 250, as shown in Figure 3, the finger 250 being moved by lever 248 and cam 244 upon movement of lever 235. Pressure relief valves such as valves 97, 98 of Figure 1 may be provided if the forceful and positive movement of pistons 294, 295 does not force the trapped oil through one of the restrictions 289, 290 at a sufficiently rapid rate.

Oil is supplied to the center groove 270 of the servovalve cylinder by a pipe 272 receiving oil under pressure either from the main oil pump or the pump of the auxiliary hydraulic system, and is transmitted to the servomotor cylinders 239 and 240 through passages 274 and 273 respectively. A pipe 276 leads from the top of the casing 225 for returning oil either to the main engine oil pump or the pump of the auxiliary hydraulic system.

Figure 7:
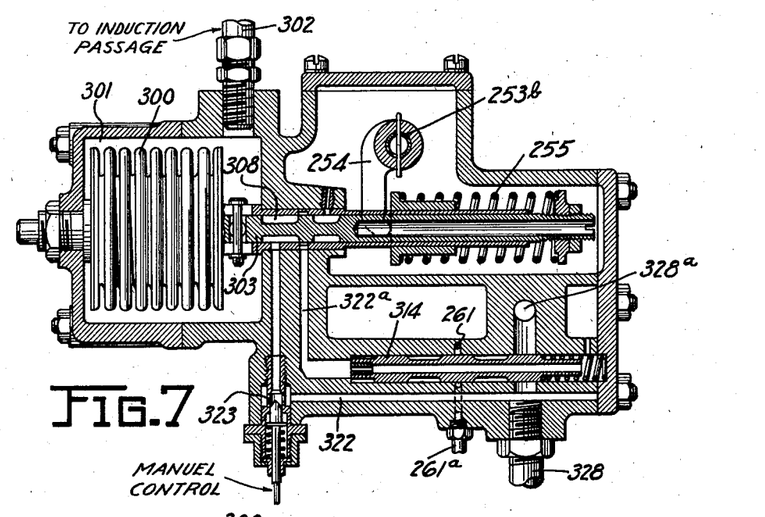
Figure 7 is a vertical sectional view taken on the line 7—7 of Figure 3.
Figure 8:
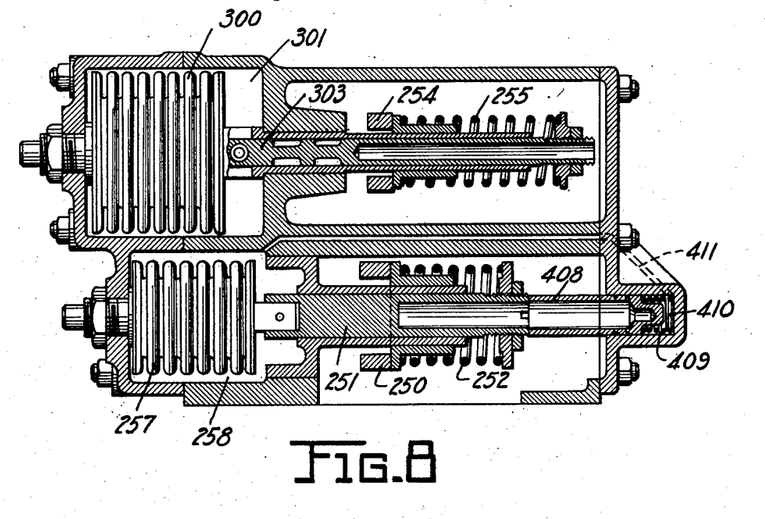
Figure 8 is a horizontal sectional view taken on the line 8—8 of Figure 3.

The supercharger shift control, as best shown in Figures 7 and 8, includes a rod 303 connected to a sealed bellows 300 adjustably mounted in a chamber 301 adapted to be connected to the induction passage inlet through a pipe 302. The bellows is variably loaded through the spring 255 by the fingers 254 to preselect the operating conditions under which the bellows will actuate the rod 303. A groove 308 in the rod 303 receives oil under pressure from a main oil supply pipe 328 and a passage 322 controlled by a pilot controlled cable operated valve 323. Upon movement of the rod 303 to the right (as viewed in Figure 7) upon attainment of a preselected shift altitude with valve 323 open, oil is transmitted through a passage 322a to quick acting valve 314, which upon movement to the right provides free communication between the oil supply pipe 328 and a passage 328a leading to a supercharger shifter device for varying the supercharging step. Movement of the valve 314 also intercommunicates bleed passage 261, leading from the boost control bellows chamber 258, with a pipe 261a, leading to the induction passage anterior to the supercharger to provide an increment increase in the charging pressure being maintained at a given setting of the pilot's control lever upon a shift into a higher supercharger step.

Figure 9:
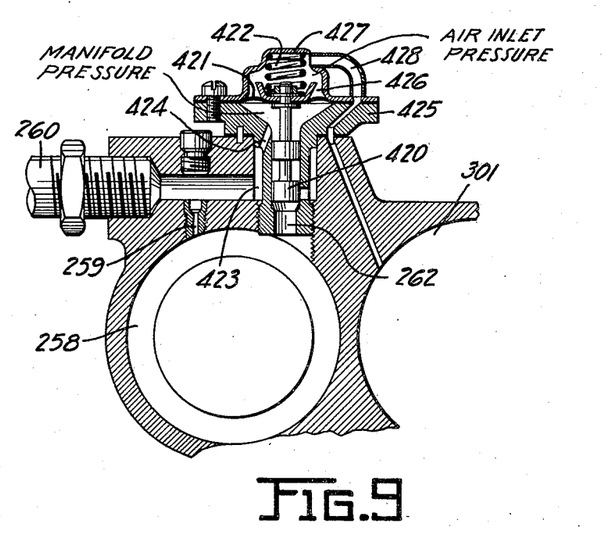
Figure 9 is a partial view in section of a modified form of control for the safety-valve of Figure 1.

In the modified safety valve arrangement of Figure 9, the bypass 262, around the calibrated restriction 259 leading from the pipe 260 into the boost control bellows chamber 258, is controlled by a valve 420 connected to a diaphragm 421 and urged onto its seat by a spring 422. The lower surface of the diaphragm 421 is subjected to the pressure in the engine manifold transmitted thereto through the pipe 260 and a groove 423 and passage 424 in the main valve body 425. A chamber 426 formed by the diaphragm 421 and a cap 427 is connected to the air inlet of the induction passage by a passage 428 leading to the bellows chamber 301 of the supercharger shift control which is in free communication with the air inlet of the induction passage. The diaphragm 421 is thus subjected to the differential between the engine manifold pressure and air inlet pressure, and will open the safety valve 420 when this differential excels a predetermined value.

Figures 10, 11:
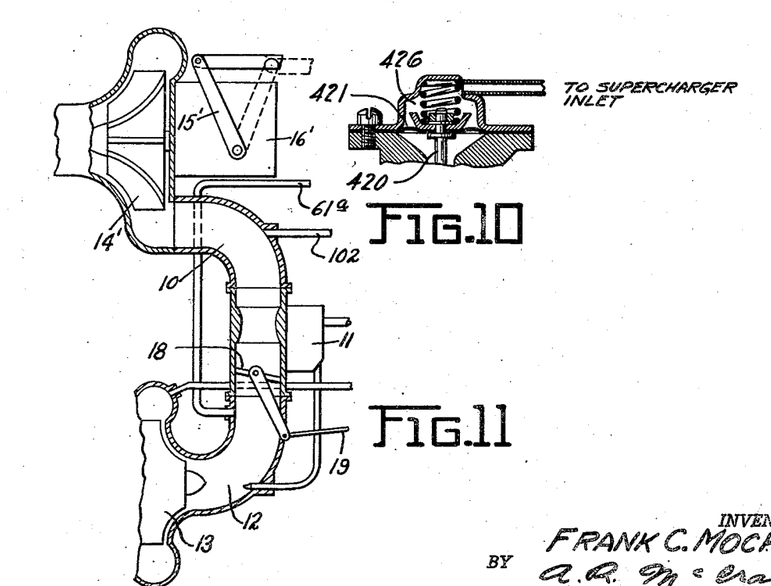
Figure 10 is a partial view in section showing a further modified arrangement of the safety-valve.
Figure 11 is a sectional diagram of a two-stage supercharging system showing the control of Figure 1 operatively connected to the auxiliary stage blower.

The modification of Figure 10 is similar to that of Figure 9 except that the chamber 426 is connected to the induction passage anterior to the supercharger rather than to the air inlet, whereby the valve 420 is adapted to open when the differential between engine manifold pressure and supercharger inlet pressure exceeds a predetermined value.

Although the invention has been described with reference to the particular embodiments disclosed in the drawings, it will be apparent that many changes or rearrangements of the parts may be made without departing from the spirit of the invention. For example, with reference to Figure 1, it will be apparent that movement of the arm 28 and gears 31 and 32 are so related that movement of any two of the members jointly determines the movement of the third member, such that any one could be controlled by the pilot's control lever, another could be connected to the throttle, and the third controlled by the boost control servomotor. Also, although oil type of servo controlled actuation is disclosed, other types would also be suitable. Furthermore, although the supercharger shift control is here shown combined with a boost control and a propeller pitch governor control to provide a unified engine control, it will be apparent that the shift control could be employed either by itself or with various other types of boost controls and/or engine speed controls. Many other modifications will likewise be apparent to one skilled in the art from the foregoing description taken in connection with the appended drawings, and it should therefore be understood that the invention is not to be limited to the particular modifications disclosed nor otherwise than in accordance with the terms of the subjoined claims.

I claim:

1. In a control for an internal combustion engine having a multiple step supercharging system, a variable datum charging pressure control, automatic means for varying the supercharging step, common means for varying the datum of the charging pressure control and for modifying the operation of the automatic means, and means for automatically increasing the datum of the charging pressure control upon increase in the supercharger step.

2. In a control for an internal combustion engine having a multiple step supercharging system, a variable datum charging pressure control, automatic means for simultaneously increasing both the supercharging step and the datum of the charging pressure control, said means being adapted to become operative at selected engine operating conditions, and means for simultaneously varying the datum of the charging pressure control and preselecting the engine operating conditions at which the automatic means will become operative.

3. A control for an internal combustion engine of an aircraft having a throttle controlled induction passage opening in the forward direction of the aircraft and a multiple step supercharging system, comprising a variable datum charging pressure control, means including a control element for varying the supercharging step, a movable wall responsive to variations in pressure in the induction passage anterior the supercharger for controlling the element, and means responsive to a change in the datum of the charging pressure control for also controlling the element.

4. A control for an internal combustion engine having a throttle controlled induction passage and a multiple step supercharging system, comprising automatic means for variably positioning the throttle to maintain a selected charging pressure, means for varying the supercharging step, and means responsive to variations in altitude for actuating the varying means to automatically increase the supercharging step when the altitude is such that the charging pressure with the throttle wide open is substantially equal to the selected charging pressure.

5. In a control for an internal combustion engine having a multiple step supercharging system, a throttle, a pressure chamber, a connection from the pressure chamber to the engine manifold, means responsive to the pressure in the chamber for controlling the throttle, an outlet from the pressure chamber, and means for varying the relative flow capacities of the connection and the outlet upon change in the step of supercharging.

6. In a control for an internal combustion engine having an induction passage and variable capacity supercharging system, a throttle in the passage, an air chamber, a connection from the air chamber to the engine manifold, a charging pressure control including an element responsive to the pressure in the air chamber for variably controlling the throttle to thereby control the charging pressure, a passageway for bleeding air from the chamber and means automatically operable upon a change in supercharger capacity for varying the relative flow capacities of the connection and the passageway to thereby vary the charging pressure being maintained by the charging pressure control.

7. The invention defined in claim 6 together with means for appreciably increasing the effective flow capacity of the connection to thereby render the passageway substantially inoperative for varying the pressure in the air chamber.

8. In a control for an internal combustion engine having a throttle controlled induction passage and a two-step supercharger posterior to the throttle, a pressure chamber, an engine charging pressure control having an element responsive to the pressure in the chamber for variably positioning the throttle, a connection from the chamber to the induction passage posterior to the supercharger, a second connection from the chamber to the induction passage anterior to the supercharger, a valve controlling the second connection and adapted to be closed in the low supercharger step and open in the high step, and valve means controlling one of said connections and adapted to reduce the effectiveness of the second connection.

9. The invention defined in claim 8 wherein the valve means is controlled by a capsule responsive to the pressure in the induction passage posterior to the supercharger.

10. The invention defined in claim 8 wherein the valve means is responsive to the differential in the pressures in the induction passage anterior and posterior to the supercharger.

11. The invention defined in claim 8 wherein the valve means is responsive to the differential in the pressures in the induction passage posterior to the supercharger and in the inlet of the induction passage.

12. A control for an internal combustion engine of an aircraft having an induction passage including an air entrance opening in a forward direction to be subjected to variations in air pressure with variations in aircraft speed, a throttle, and a multiple step supercharger: comprising a charging pressure control having a fluid actuated member for varying the position of the throttle, a valve controlling the supply of motivating fluid to the member, a sealed bellows responsive to the pressure in the passage posterior to the supercharger for controlling said valve, another fluid actuated member for increasing the step of the supercharger, a second valve controlling the supply of motivating fluid to the said other member, a bellows responsive to the pressure in the air entrance for controlling said second valve, and means for modifying said last-named control in accordance with engine charging pressure.

13. A control for an internal combustion engine having a throttle and a multiple step supercharging system comprising a pinion rotatably mounted on a movable member, a pair of independently movable toothed members in engagement with said pinion, means connecting one of said members to the throttle, manually operable means for actuating another of said members, power actuated means for actuating the third of said members, power means for changing the supercharging step, an element for controlling the last-named power means, and a connection between the manual means and the element.

14. A control for an internal combustion engine having a throttle and a multiple step supercharging system, comprising a planetary gear train having concentrically mounted and relatively rotatable internal and external spur gear members, a member rotatable about the axis of said gears, and a spur gear pinion pivotally mounted on the last-named member and in mesh with both of said gear members; a connection from one of said members to the throttle; manual means for actuating another of said members; power means including an element responsive to variations in the charging pressure of the engine for actuating the third of said members; power means including an element responsive to variations in barometric pressure for changing the supercharging step; and means actuated by the manual means for concurrently varying the pressure responsiveness of both of said elements.

15. A control for an aircraft engine having an induction passage and a multiple-step supercharging system comprising a throttle for controlling the air supply to the engine, a wall movable in response to variations in the charging pressure of the engine, a spring yieldingly resisting movement of said wall, power means controlled by the wall for actuating the throttle, a second wall movable in response to variations in air supply pressure, a spring yieldingly resisting movement of said wall, power means controlled by the second movable wall for varying the step of supercharging, and means for simultaneously varying the resisting force of the said springs.

16. The invention defined in claim 15 comprising in addition a propeller pitch governor for varying the engine speed adapted to be controlled by the said means for varying the resisting force of the springs.

17. A control for an internal combustion engine having a throttle controlled induction passage and a two-speed supercharger posterior to the throttle, a chamber connected by calibrated passages to the induction passage anterior and posterior to the supercharger, a sealed evacuated capsule in the chamber having a movable wall, a spring resisting movement of the wall, power means controlled by the wall for actuating the throttle, a second capsule having a wall movable in response to variations in induction passage inlet pressure, a spring resisting movement of the last-named wall, power means controlled by the last-named wall for changing the speed of the supercharger, a valve controlling one of the calibrated passages and adapted to operate upon change from one supercharger speed to the other, and manual means for varying the resisting force of the springs.

18. The invention defined in claim 17 comprising in addition a bypass in parallel with the calibrated passage leading from the chamber to the induction passage posterior to the throttle, a normally closed valve in said bypass, and pressure responsive means for opening said valve.

19. A control for a throttle controlled engine having a multiple step supercharger, said control comprising a casing, a hollow shaft rotatably mounted in the casing and projecting therefrom, a second shaft rotatable within the hollow shaft, a manually operated member connected to one of said shafts, means connecting the other shaft to the throttle, a lever within the casing secured to said other shaft, a pinion pivotally mounted on the lever, a pair of gear segments within the casing in mesh with the pinion, one of said segments being secured to the said one shaft, a servomotor including a fluid operated member for actuating the other of said segments, a device for changing the supercharger step, a servo-motor for actuating said device, means including a pair of springs for respectively controlling the said servo-motors, and means including a pair of cams connected to said one shaft for variably loading the said springs.

20. In a control for an internal combustion engine having a throttle and a variable step supercharging system, a servo-motor for actuating the throttle, means including a wall responsive to a pressure variably dependent upon the engine charging pressure for controlling the servo-motor, means including a passage for varying the said pressure relative to the charging pressure, a fluid actuated member for changing the step of supercharging, fluid actuated valve means for controlling the said passage and the flow of fluid to the fluid actuated member, and a valve responsive to pressures varying with change in altitude for controlling the flow of fluid to the fluid actuated valve means.

21. A control for internal combustion engine having a multiple step supercharging system; comprising a variable datum engine charging pressure control, means for selecting an engine charging pressure, and means for automatically and substantially simultaneously increasing both the supercharger step and the datum setting at an altitude variably dependent upon the selected charging pressure.

22. A control for an internal combustion engine having a variable capacity supercharging system, comprising a variable datum engine charging pressure control, manual means for selecting an engine charging pressure to be maintained by said control, and means for automatically and substantially simultaneously increasing the supercharging capacity and the selected charging pressure at an altitude variable dependent upon the manual means.

23. A control for an internal combustion engine having a throttle controlled induction passage and a variable capacity supercharging system, comprising automatic means for variably positioning the throttle to maintain a selected charging pressure, means for increasing the supercharging capacity, and means becoming operative at substantially the critical altitude for the selected charging pressure and the supercharging capacity then obtaining irrespective of throttle position, for automatically increasing the supercharging capacity.

24. In a control for an internal combustion engine having a variable capacity supercharging system, a throttle, a pressure chamber, connections from the chamber to the engine manifold and to another source of pressure, means responsive to the pressure in the chamber for controlling the throttle, and means for varying the relative flow capacities of the connections with change in the capacity of the supercharging system.

25. In a control for an internal combustion engine having a throttle controlled induction passage and a supercharger therein, an air chamber, connections from the chamber to the induction passage anterior and posterior to the supercharger, means responsive to the pressure in the chamber for controlling the throttle, means for varying the ratio of supercharger speed to engine speed, and means for varying the relative flow capacities of the said connections upon variation in the said ratio.

26. The invention defined in claim 25 comprising in addition means operative at relatively high engine charging pressure for further varying the relative flow capacities of the said connections.

27. In a control for an internal combustion engine having a variable capacity supercharging system, a variable datum charging pressure control, a main power control lever for variably selecting the datum, automatic means for varying the capacity of the supercharging system relative to the engine speed, said means being operative at engine operating conditions variably determined by the setting of the control lever, and means for increasing the datum for a given position of the control lever upon operation of said automatic means to increase the capacity of the supercharging system.

28. In combination, an engine regulating means for the engine, a control lever connected to the regulating means for positioning it, a control device responsive to a control force which is a measure of an operating condition of the engine connected to the regulating means for positioning it in response to changes in the value of such force, means for adjusting the setting of said control device, and means connecting said adjusting means to said control lever which sets the control device for a value of said control force different from that for which it sets the control device.

29. In combination, an engine, valve means for regulating the engine, a control lever connected to said valve means for positioning it, a control device responsive to a control force which is a measure of the power output of the engine connected to said valve means for positioning it in response to changes in the value of said control force, adjustable means for changing the setting of said control device, and means connecting said adjustable means to said control lever which sets the control device for a control force greater than that for which the valve means is positioned by the control lever.

30. A pressure regulator for a supercharged internal combustion engine having a throttle valve comprising, in combination, manually operable means for moving the throttle valve and for selecting an engine intake pressure to be maintained, an engine-intake-pressure-sensitive element, a servo-motor capable of adding to the manually-effected movement of the throttle valve a movement required to bring the throttle valve into substantially wide-open position at critical altitude when the manually operable means is in a certain low-pressure-selecting-position and a movement which is greater than necessary when the manually operable means is in positions selecting higher pressures, means for controlling the servo-motor under joint control by the manually operable means and by said element whereby the throttle valve is moved by the servo-motor to compensate for deviations of intake pressure from selected pressure, and means for conditioning the servo-motor control means to arrest that movement of the servo-motor which would move the throttle valve past wide-open position when said throttle valve has been moved into substantially wide-open position.

31. A pressure regulator for a supercharged internal combustion engine having a throttle valve comprising, in combination, manually operable means for moving the throttle valve and for selecting an engine intake pressure to be maintained, an engine-intake-pressure-sensitive element, an hydraulic servo-motor capable of adding to the manually-effected movement of the throttle valve a movement required to bring the throttle valve into substantially wide-open position at critical altitude when the manually operable means is in a certain low-pressure-selecting position and a movement which is greater than necessary when the manually operable means is in positions selecting higher pressures, a valve for controlling the servo-motor under joint control by the manually operable means and by said element whereby the throttle valve is moved by the servo-motor to compensate for deviations of intake pressure from selected pressure, and means responsive to movement of the throttle valve into substantially wide-open position for moving the servo-motor-control-valve into equilibrium position thereby arresting that movement of the servo-motor which would move the throttle valve past wide-open position.

32. A pressure regulator for a supercharged internal combustion engine having a throttle valve comprising, in combination, manually operable means for moving the throttle valve and for selecting an engine intake pressure to be maintained, an engine-intake-pressure-sensitive element, an hydraulic servo-motor capable of adding to the manually-effected movement of the throttle valve a movement required to bring the throttle valve into substantially wide-open position at critical altitude when the manually operable means is in a certain low-pressure-selecting-position and a movement which is greater than necessary when the manually operable means is in positions selecting higher pressures, a valve for controlling the servo-motor under joint control by the manually operable means and by said element whereby the throttle valve is moved by the servo-motor to compensate for deviations of intake pressure from selected pressure, and means responsive to movement of the throttle valve into substantially wide-open position for hydraulically locking the servo-motor.

33. A pressure regulator for a supercharged internal combustion engine having a throttle valve comprising, in combination, a manually operable main control member, means operated thereby for selecting an engine intake pressure to be maintained, an engine-intake-pressure-responsive element, automatic means under control by the pressure selecting means and by said element for moving the throttle valve when engine intake pressure deviates from the selected pressure, a servo-motor for controlling the speed of a blower connected with the engine intake, and means for effecting operation of the servo-motor to increase blower speed in response to the attainment of various altitudes depending on certain pressure selections, said means including a device positioned by the main control member for determining the altitudes to be attained in accordance with a predetermined schedule of pressure selections and altitudes.

34. A pressure regulator for a supercharged internal combustion engine having a throttle valve comprising, in combination, a manually operable main control member, means operated thereby for selecting an engine intake pressure to be maintained, an engine-intake-pressure-responsive element, automatic means under control by the pressure selecting means and by said element for moving the throttle valve when engine intake pressure deviates from the selected pressure, a servo-motor for controlling the speed of a blower connected with the engine intake, means for effecting operation of the servo-motor to increase blower speed in response to the attainment of various altitudes depending on certain pressure selections, said means including a device positioned by the main control member for determining the altitudes to be attained in accordance with a predetermined schedule of pressure selections and altitudes, and means responsive to the operation of the servo-motor to increase blower speed for increasing the selected pressure when the pressure selections are within a limited range.

35. A pressure regulator for a supercharged internal combustion engine having a throttle valve comprising, in combination, manually operable means for moving the throttle valve and for selecting an engine intake pressure to be maintained, an engine-intake-pressure sensitive element, a servo-motor capable of adding to the manually-effected movement of the throttle valve a movement required to bring the throttle valve into substantially wide open position at critical alitude when the manually operable means is in a certain low-pressure-selecting-position and a movement which is greater than necessary when the manually operable means is in positions selecting higher pressures, means for controlling the servo-motor under joint control by the manually operable means and by said element whereby the throttle valve is moved by the servo-motor to compensate for deviations of intake pressure from selected pressure, a stop device operable to prevent further movement of the throttle by said servo-motor when said throttle reaches a predetermined open position, actuating means for moving said stop device into its effective position and means operated by the servo-motor for operating the actuating means for said stop device.

36. A pressure regulator for a supercharged internal combustion engine having a throttle valve comprising, in combination, manually operable means for moving the throttle valve and for selecting an engine intake pressure to be maintained, an engine-intake-pressure-sensitive element, a servo-motor capable of adding to the manually-effected movement of the throttle valve a movement required to bring the throttle valve into substantially wide-open position at critical altitude when the manually operable means is in a certain low-pressure-selecting-position and a movement which is greater than necessary when the manually operable means is in positions selecting higher pressures, means for controlling the servo-motor under joint control by the manually operable means and by said element whereby the throttle valve is moved by the servo-motor to compensate for deviations of intake pressure from selected pressure, a stop device operable to prevent movement of the throttle past wide open position by the servo motor, actuating means for moving said stop device into its effective position and means operated by the servo motor for operating the actuating means for said stop device.

37. A pressure regulator for a supercharged internal combustion engine having a throttle valve comprising, in combination, manually operable means for moving the throttle valve and for selecting an engine intake pressure to be maintained, an engine-intake-pressure-sensitive element, a servo-motor capable of adding to the manually effected movement of the throttle valve a movement required to bring the throttle valve into substantially wide open position at critical altitude when the manually operable means is in a certain low-pressure-selecting position and a movement which is greater than necessary when the manually operable means is in positions selecting higher pressures, means for controlling the servo-motor under joint control by the manually operable means and by said element whereby the throttle valve is moved by the servo-motor to compensate for deviations of intake pressure from selected pressure, means for controlling the operation of said servo motor including a sleeve having ports for supplying fluid under pressure to said servo motor and a valve slidable in said cylinder and controlling said ports, means through which said pressure sensitive element automatically operates said valve upon changes in engine intake pressure to cause said servo-motor to move the throttle valve toward open or closed position, means operable when the throttle is moved to a predetermined open position to engage said valve in order to prevent any further operation of the servo-motor in the direction in which it moves to open said throttle, and means operated by the servo-motor to move said valve engaging means into valve engaging position.

38. In a throttle valve controller for supercharged internal combustion engines for aircraft, a servo-motor having a movable operating member, a variably positioned device for selecting the intake pressure to be maintained, a main control lever for operating the pressure selector and for imparting to the throttle valve an increasing opening movement as the pressure selection increases, the pressures obtainable by opening the throttle manually being less than the selected pressures, means under the control of the pressure selecting device and responsive to engine intake pressure for determining the travel of the servo-motor member necessary to locate the throttle in that position of opening required to maintain the selected pressure, the maximum travel of the servo-motor member being in excess of that required to move the throttle wide open when the pressure selections are in the major portion of the range of pressure selections required during flight, a differential mechanism including a first adjustable member connected with the throttle and having a second adjustable member positioned by the control lever, and means initially set by the positioning of the second adjustable member of the differential mechanism for transmitting from the movement of the servo-motor member that movement which is required to bring the throttle substantially to wide-open position throughout the major portion of the range of pressure selections required during flight.

39. Apparatus for controlling tne manifold pressure of a supercharged aircraft engine comprising an induction throttle valve which directly controls the manifold pressure, manually operable means for effecting an opening movement of the throttle valve, a fluid pressure operated servo-motor connected with the throttle valve for causing additional opening movements thereof, a valve for controlling the servo-motor, lever means for actuating the control valve, means compensated for altitude change and responsive to manifold pressure automatically to move the lever means to actuate the control valve to effect such operation of the servo-motor as to cause such additional opening movements of the throttle valve as are required to maintain a predetermined manifold pressure at various altitudes, and means actuated by the manual means for positioning said lever means in order to change the datum position of the control valve in order to select a predetermined pressure to be maintained.

40. Apparatus for controlling the manifold pressure of a supercharged aircraft engine comprising an induction throttle valve which directly controls the manifold pressure, manually operable means for effecting an opening movement of the throttle valve, a fluid pressure operated servo-motor connected with the throttle valve for causing additional movements thereof, a valve for controlling the servo-motor, lever means for actuating the control valve, means compensated for altitude change and responsive to manifold pressure automatically to move the lever means to actuate the control valve to effect such operation of the servo-motor as to cause such additional opening movements of the throttle valve as are required to maintain a predetermined manifold pressure at various altitudes, a movable cam for positioning the lever means, and means actuated by the manual means for moving the cam in order to position the lever means in order to change the datum position of the control valve in order to select a predetermined pressure to be maintained.

41. Apparatus for controlling the manifold pressure of a supercharged aircraft engine comprising an induction throttle valve which directly controls the manifold pressure, manually operable means for effecting an opening movement of the throttle valve, a fluid pressure operated servo-motor connected with the throttle valve for causing additional opening movements thereof, a valve for controlling the servo-motor, lever means for actuating the control valve, means responsive to manifold pressure automatically to move the lever means to actuate the control valve to effect such operation of the servo-motor as to cause such additional opening movements of the throttle valve as are required to maintain a predetermined manifold pressure at various altitudes, and means actuated by the manual means for positioning said lever means in order to change the datum position of the control valve in order to select a predetermined pressure to be maintained.

References Cited in the file of this patent

UNITED STATES PATENTS

| | | |
|---|---|---|
| 2,233,307 | Dodson | Feb. 25, 1931 |
| 2,079,958 | Dodson | May 11, 1937 |
| 2,187,737 | Gregory | Jan. 23, 1940 |
| 2,217,364 | Halford et al. | Oct. 8, 1940 |
| 2,223,715 | Berger | Dec. 3, 1940 |
| 2,228,239 | Ammann | Jan. 14, 1941 |
| 2,242,374 | Schultz et al. | May 30, 1941 |
| 2,283,644 | Nallinger | May 19, 1942 |
| 2,290,884 | Killmann | July 28, 1942 |
| 2,310,831 | Bielitz | Feb. 9, 1943 |
| 2,330,866 | Camner | Oct. 5, 1943 |
| 2,612,226 | Crum | Sept. 30, 1952 |
| 2,708,426 | Gardiner et al. | May 17, 1955 |

FOREIGN PATENTS

| | | |
|---|---|---|
| 495,497 | Great Britain | May 31, 1938 |
| 505,829 | Great Britain | May 17, 1939 |
| 522,592 | Great Britain | June 21, 1940 |

U. S. DEPARTMENT OF COMMERCE
PATENT OFFICE

CERTIFICATE OF CORRECTION

Patent No. 2,818,847        Frank C. Mock        January 7, 1958

It is hereby certified that error appears in the printed specification of the above numbered patent requiring correction and that the said Letters Patent should read as corrected below.

Column 8, line 49, after "pressure" insert --selected--; column 20, line 51, for "tne" read --the--.

Signed and sealed this 1st day of July 1958.

(SEAL)
Attest:
KARL H. AXLINE
Attesting Officer

ROBERT C. WATSON
Commissioner of Patents